(12) United States Patent
Oswald et al.

(10) Patent No.: US 6,315,503 B1
(45) Date of Patent: Nov. 13, 2001

(54) FEED SYSTEM FOR A ROTATING CUTTING TOOL

(75) Inventors: Johann Oswald, Böhmenkirch; Günther Grüner, Bad Überkingen, both of (DE)

(73) Assignee: EX-CELL-O GmbH, Eislingen/Fils (DE)

( * ) Notice: Subject to any disclaimer, the term of this patent is extended or adjusted under 35 U.S.C. 154(b) by 0 days.

(21) Appl. No.: 09/381,436

(22) PCT Filed: Jan. 20, 1998

(86) PCT No.: PCT/DE98/00163

§ 371 Date: Oct. 13, 1999

§ 102(e) Date: Oct. 13, 1999

(87) PCT Pub. No.: WO98/42468

PCT Pub. Date: Oct. 1, 1998

(30) Foreign Application Priority Data

Mar. 24, 1997 (DE) .............................................. 197 12 238

(51) Int. Cl.[7] ...................................................... B23B 35/00
(52) U.S. Cl. .............................. 408/1 R; 82/1.4; 408/154; 408/173; 408/178
(58) Field of Search .................................... 408/1 R, 150, 408/153, 154, 156, 173, 178; 82/1.11, 1.2, 1.4

(56) References Cited

U.S. PATENT DOCUMENTS

| | | | |
|---|---|---|---|
| 2,820,376 | * | 1/1958 | Jannenga et al. ......................... 82/1.2 |
| 3,169,416 | * | 2/1965 | Carlson et al. .......................... 82/1.4 |
| 3,391,585 | * | 7/1968 | Griswold et al. ........................ 82/1.4 |
| 3,499,352 | * | 3/1970 | Milewski et al. ..................... 408/173 |
| 4,066,380 | * | 1/1978 | Beck et al. ............................. 408/173 |
| 4,343,576 | * | 8/1982 | Lagerholm et al. .................. 408/178 |
| 4,789,278 | | 12/1988 | Dexter et al. . |
| 4,933,868 | * | 6/1990 | McMurtry ............................. 408/173 |
| 6,158,311 | * | 12/2000 | Watkins et al. .......................... 82/1.4 |

FOREIGN PATENT DOCUMENTS

| | | |
|---|---|---|
| PS 965 279 | 6/1957 | (DE) . |
| DT 22 00 485 B2 | 6/1975 | (DE) . |
| 24 05 694 A | 8/1975 | (DE) . |
| 121587 | 8/1976 | (DE) . |
| 3430313 C2 | 1/1987 | (DE) . |
| 35 25 516 A1 | 1/1987 | (DE) . |
| 3605850 A1 | 8/1987 | (DE) . |
| 40 15 509 C1 | 7/1991 | (DE) . |
| 0 654 315 A1 | 5/1995 | (EP) . |
| 2 013 539 A | 8/1979 | (GB) . |
| 2 130 937 A | 6/1984 | (GB) . |

\* cited by examiner

Primary Examiner—Daniel W. Howell
(74) Attorney, Agent, or Firm—Oliff & Berridge, PLC

(57) ABSTRACT

There is disclosed a feed system for a rotating cutting tool which is driven by a spindle and is adjustable in the feeding direction via an adjusting means. The adjusting means is driven by an operating shaft which can be driven synchronously with the spindle or at a predetermined difference in speed with respect to the spindle by a separate feed motor. In the case of a synchronous drive of the operating shaft and the spindle no feed is effected, whereas the cutting tool is adjusted, when a speed difference is adjusted by the adjusting means. After adjusting the desired position of the cutting tool, the operating shaft and the spindle are again driven at the same speed.

19 Claims, 9 Drawing Sheets

FEED SYSTEM FOR A ROTATING CUTTING TOOL

BACKGROUND OF THE INVENTION

1. Field of Invention

The invention relates to a feed system for a rotating cutting tool in accordance with the preamble of claim 1.

2. Description of Related Art

Feed systems of this kind are used in the series manufacture of case components, for instance of engine/transmission cases. The respective machining stations, for example transfer machines, fine-boring units, special machines, horizontal boring machines or machining centers are equipped with a feed system for boring tools in which the cutting tool is coupled with a work spindle of the machine tool via the feed system.

The feed system permits to compensate defects occurring during manufacture which may occur, for instance, due to the wear of cutting edges, cutting edge tolerance, adjusting errors or dimensional variations, caused by temperature changes of the machine, etc. Moreover the feed systems permit to form cylinder bores having most narrow tolerances or having bores the radius of which is variable in response to the boring depth (e.g. forming of chamfers, radii, recesses, convex, concave or tapered circumferential walls).

In the known system the cutting tools may be formed on different tool holding fixtures, for instance boring bars, so-called eccentric spindles or feeding heads.

In FIG. 1, which is referred to already in this place, a known feed system distributed by the applicant by the name "eccentric spindle" is shown. In this feed system a tool holding fixture 2 is arranged coaxially at an eccentric spindle 4 which, in turn, is rotatably supported in a work spindle 6. The axis of the eccentric spindle 4 is offset vis-á-vis the axis of the work spindle 6 by the measure e. I.e. by rotating the eccentric spindle 4 a cutting tool (not represented) held in the tool holding fixture 2 can be radially offset vis-á-vis the axis of the work spindle 6 and thus a feed motion can be performed.

In the known feed system the adjusting movement of the cutting edge with respect to the work spindle 6 is effected by means of a comparatively complex drive system the principal components of which are briefly described hereinafter.

The known drive system includes a servomotor 8 the output shaft 10 of which is connected to a circulating ball spindle indicated by the reference numeral 12 in FIG. 1. By the circulating ball spindle 12 the rotation of the servomotor 8 is converted into an axial movement by which an adjusting slide 14 is movable in axial direction, i.e. in parallel to the axis of the work spindle 6, in response to the control. In the adjusting slide 14 a connecting member 16 coupled to a connecting bar 18 is rotatably supported. The connecting bar 18 is guided to be axially movable in the work spindle 6. Between the end portion of the connecting bar 18 on the side of the tool holding fixture and the adjacent end portion of the eccentric spindle 4 guided in the work spindle 6 there is disposed a lift-off rotary transformer 20 via which the axial movement of the connecting bar 18 can be converted into a rotation and thus a rotation of the eccentric spindle 4 with respect to the work spindle 6 can be realized.

For the adjustment the servomotor 8 is appropriately driven so that the adjusting slide 14 is moved free from play along its axial guide via the circulating ball spindle 12 and thus the connecting bar 18 immerses into the work spindle 6. The axial movement of the connecting bar 18 is converted into a rotation of the eccentric spindle 4 by the lift-off rotary transformer 20 so that, in response to the control of the step motor 8, the eccentric spindle 4 is adjusted so that the tool cutting edge is adjustable with respect to the work spindle 6.

The work spindle 6 is driven via a pulley 22 indicated by a dot-dash line, so that the cutting tool held in the tool holding fixture 2—for instance a boring tool—is rotated. As the components required for adjusting the cutting edge are substantially supported in the work spindle 6 or are connected with the same, considerable efforts have to be made to ensure the desired transmission free from play of the adjusting movement of the servomotor 8 to the eccentric spindle 4.

The system represented in FIG. 1 moreover has a very complex structure, because a multiple conversion of translatory movements into rotary movements is required. The moved masses are relatively large in the case of this feed system so that also the support of the work spindle and the motors required for the drive of the work spindle 6 have to be adequately designed.

In GB2130937A a feed system is described in which the cutting edge if fixed to an eccentric adapted to be rotated vis-á-vis a work spindle. The eccentric is adjusted by an adjusting shaft connected to a servomotor via a planetary gear. The transmission ratio of the planetary gear is selected to be such that the adjusting shaft automatically rotates with the work spindle in the basic setting. By driving the servomotor the adjusting shaft can be rotated via the planetary gear vis-á-vis the work spindle so that a feed motion is effected.

What is a drawback with this design is that a considerable expenditure in terms of apparatuses is necessary to couple the adjusting shaft via the planetary gear with the servomotor and to convert the motion of rotation of the adjusting shaft in the tool holding fixture into an adjustment of the eccentric.

SUMMARY OF THE INVENTION

In contrast to this, the object underlying the invention is to provide a feed system for a rotating cutting tool in which a precise feed is permitted with a minimum expenditure in terms of apparatuses.

This object is achieved by a feed system comprising the features of claim 1.

In the feed system according to the invention an eccentric spindle and an operating shaft are synchronously driven, each via a separate drive. The feed motion is effected by adjusting a difference in speed between the eccentric spindle and the operating shaft guided in the eccentric spindle via an eccentric portion.

It is an essential feature of the invention that an adjusting means effecting the feed motion is driven via an operating shaft which is adapted to be driven via a separate feed motor alternatively synchronously with the spindle or at a predetermined difference in speed with respect to the speed of the spindle. In the first case, i.e. when the operating shaft and the spindle are driven at the same speed, no feed motion of the adjusting means is effected, because a transmission element of the adjusting means maintains its relative position with respect to a control surface of the adjusting means. In the latter case, i.e. when the spindle and the operating shaft are driven at different speeds, a feed motion is effected, because the control surface is moved with respect to the transmission element as long as the difference in speed is maintained. As soon as the tool holding fixture-supporting the cutting tool is moved into the desired position, the speed of the operating shaft is again brought to the speed of the spindle (or vice versa) so that no further relative movement between the control surface and the transmission element occurs—the feeding operation is completed. The control surface is usually formed at the outer circumference of a shaft portion connected to the operating shaft and can be designed, for instance, in the form of an involute or as an eccentric surface with respect to the rotation axis of the spindle.

An essential advantage of the feed system according to the invention resides in the fact that substantially only rotating components are used for effecting the feed motion so that the expenditure in terms of apparatuses can be considerably reduced vis-á-vis the conventional solutions in which translatory motions had to be converted into motions of rotation.

The use of rotation-symmetrical components moreover permits extremely high speeds both for the spindle and for the operating shaft so that high machining outputs can be realized.

By an appropriate selection of the geometries of the control surfaces different feed characteristics can be materialized so that even extremely small dimensional corrections or compensations in the range of 0.001 mm are feasible.

Since the feed motion is effected solely due to a difference in speed between the operating shaft and the spindle, almost the entire range of the control surface can be infinitely exploited by varying the speed. Rapid feed motions can also be realized during the machining operation by selecting appropriate drive systems.

It is especially advantageous when the operating shaft is guided in the spindle at least in sections. In such case the operating shaft can be a hollow shaft so that the coolant/lubricant can be guided through the operating shaft to the cutting edge.

In addition to the radially adjustable cutting edge, the tool holding fixture is adapted to hold a further premachining tool which is preferably not adjustable by the feed system according to the invention.

Each of the spindle and the operating shaft can be driven via a belt drive or—as an alternative—can be directly coupled to the rotor of an electric motor, for instance a D.C. motor, a threephase motor including a rotary frequency converter (for instance a threephase asynchronous motor).

Principally an analog or digital drive technology can be used for controlling the motors.

Other advantageous developments of the invention constitute the subject matter of the further subclaims.

BRIEF DESCRIPTION OF THE DRAWINGS

Preferred embodiments of the invention will be described hereinafter in detail by way of schematic drawings, where.

DETAILED DESCRIPTION OF PREFERRED EMBODIMENTS

Figure 1:
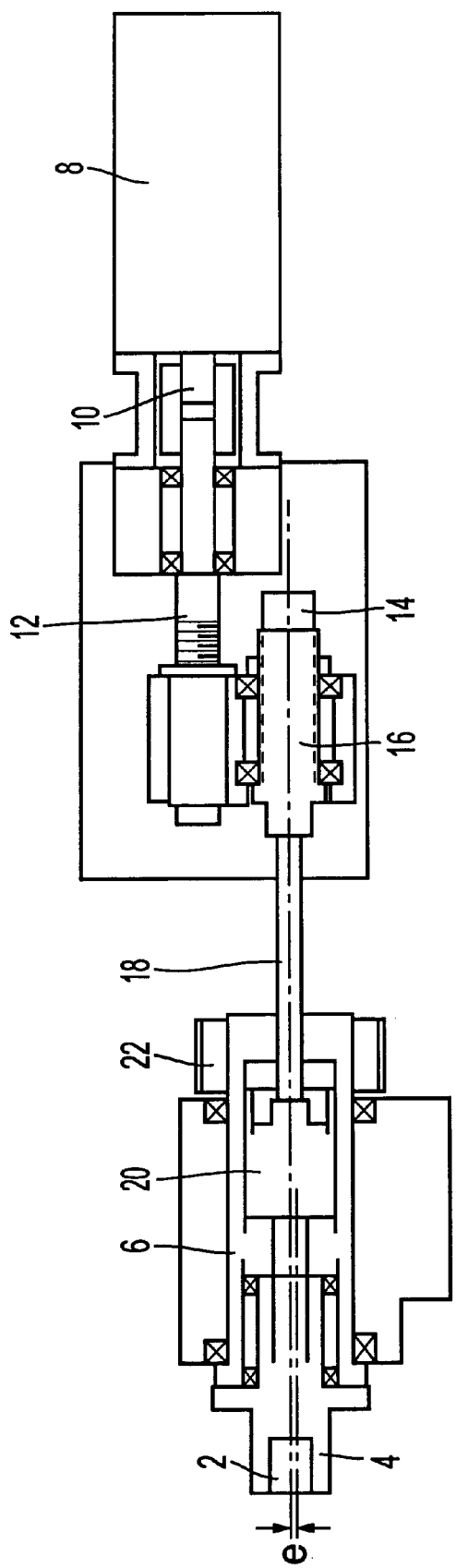
FIG. 1 shows a known feed system including an eccentric spindle.

By way of the FIGS. 1 to 5, for one thing, a first embodiment of a feed system including different drive variants is explained. In the following description for corresponding parts the same reference numerals as in FIG. 1 described in the beginning are used.

In the embodiment described in the following the feed system is provided with a fine-boring tool by which, for instance, bearing bores of a bearing channel for crankshaft or camshaft bearings or the like can be machined.

Figure 2:
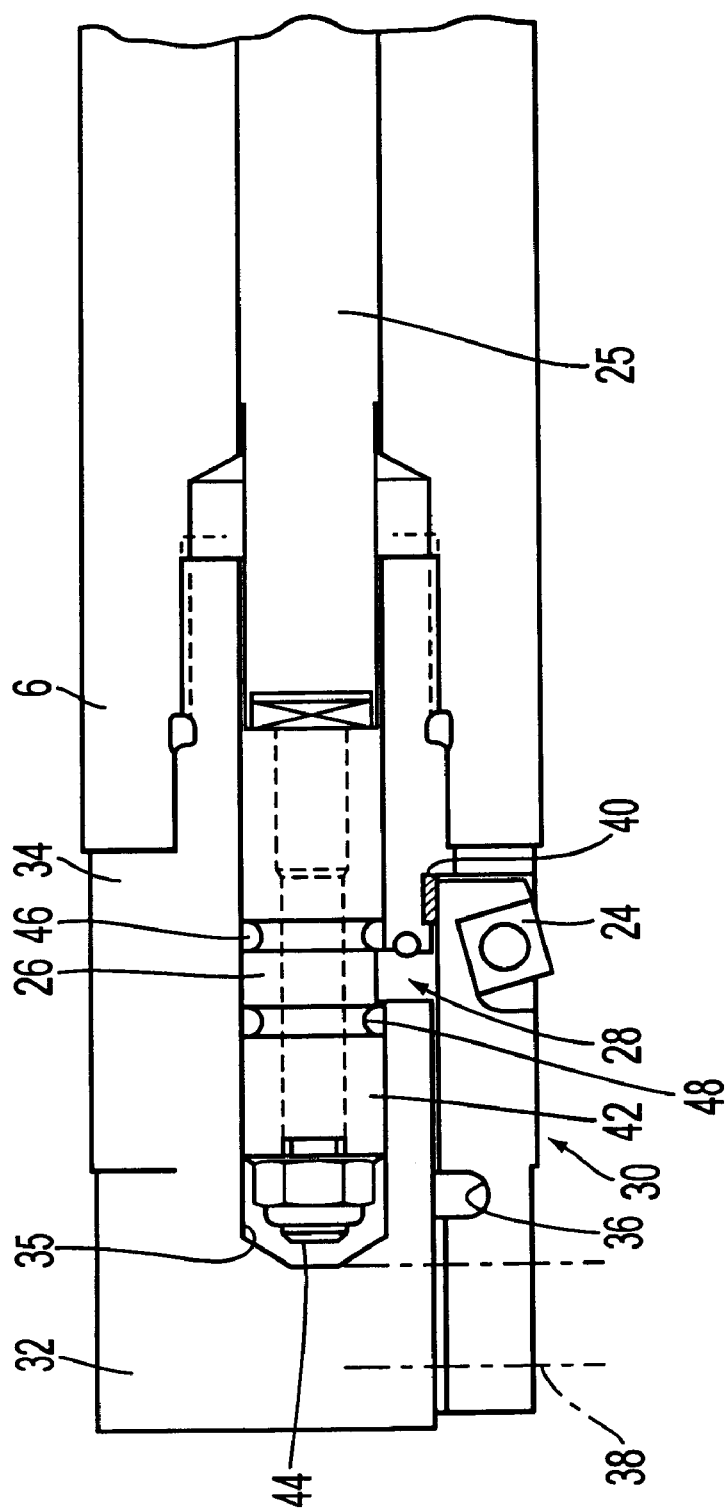
FIG. 2 shows the part of the first embodiment of a feed system on the tool side.

As is proven by FIG. 2, the feed system according to the invention comprises a work spindle 6 to which the cutting tool including a tool lip, in the present case an indexable insert 24 is fixed. For compensating defects which may occur, for instance, by the wear of cutting edges, a cutting tolerance, adjusting errors or temperature changes, the cutting edge of the indexable insert 24 can be adjusted in radial direction during the machining operation. To this end, an operating shaft 25 having a control cam including a control surface 26 at its tool-side end portion is supported in the work spindle. A transmission element, a pin 28 in the embodiment according to FIG. 2, which is biased against the control surface 26 via a bending tool holder 30 supporting the indexable insert 24 is adjacent to the control surface 26.

As can moreover be taken from FIG. 2, the spindle 6 has a boring bar or another end piece 32 which is screwed into a radially extended location hole of the spindle 6 with a hub-shaped projection 34. A guide bore 35 ending in the end piece 32 as a blind hole bore passes through the spindle 6. The pin 28 passes through the circumferential wall of the guide bore 35 and has a larger length than the wall thickness in this area so that its end portions immerse into the guide bore 35 and, resp., protrude from the outer circumference of the end piece 32.

The bending tool holder 30 is designed as a feat spring including a recess 36 assisting the spring action and is fixed, with the left end portion in FIG. 2, to a flattening of the end piece 32 (boring bar) by fastening screws 38 indicated in dot-dash lines. By a radial movement of the pin 23 the end portion of the bending tool holder 30 supporting the indexable insert 24 can be removed from a seal and can be moved radially outwardly so that the cutting edge of the indexable insert is moved in the feeding direction.

In the embodiment represented in FIG. 2 the control surface 26 is not directly formed at the operating shaft 25 but at a control member 42 which is screwed with the operating shaft 25 via a threaded bolt 44. In order to ensure a torsionally strong connection, the end portion of the control member 42 shown on the right in FIG. 2 is in positive engagement with the adjacent end portion of the operating shaft 25.

The control surface 26 is formed between two annular grooves 46,48 arranged at an axial distance.

Figure 3:
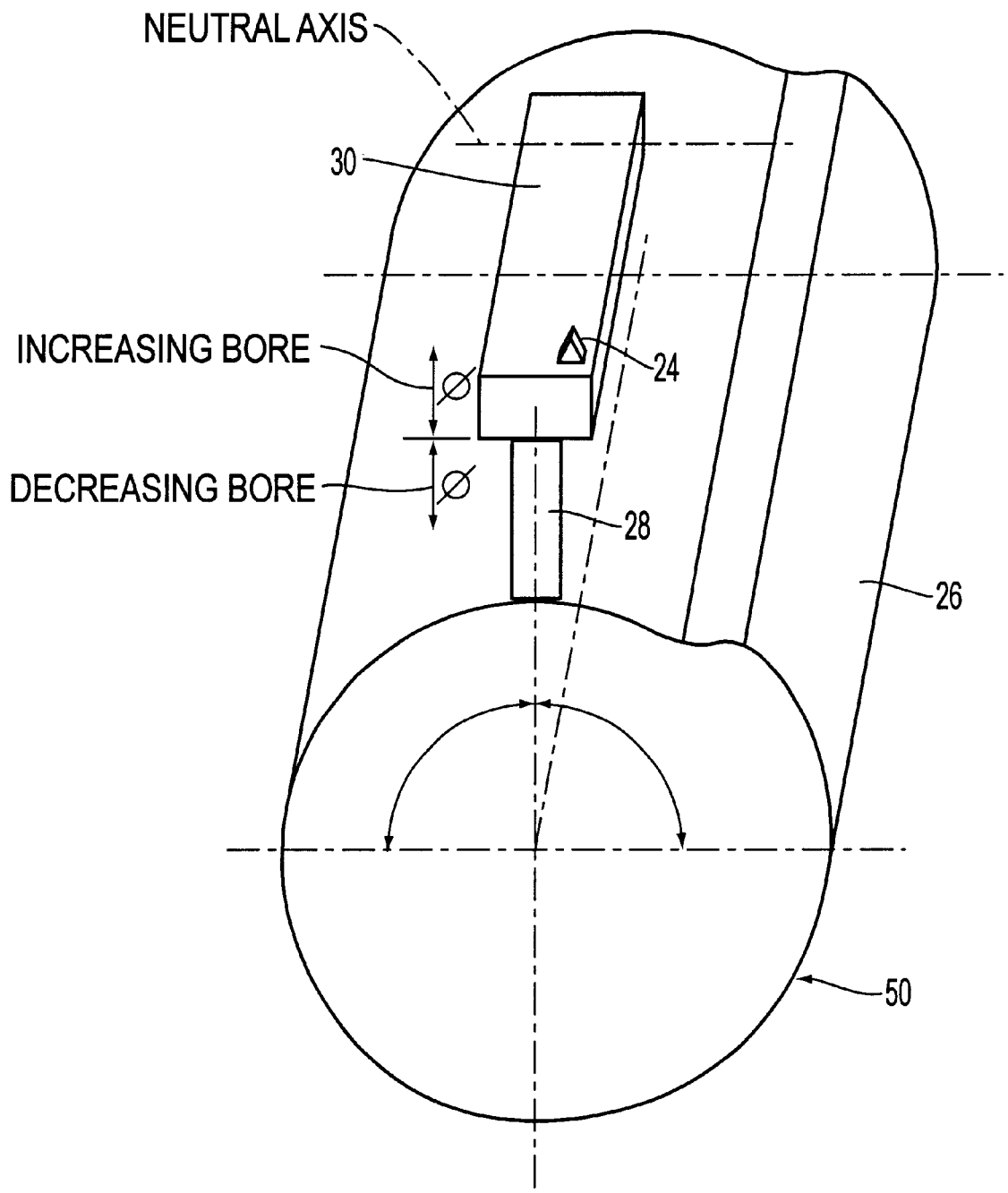
FIG. 3 is a schematic diagram to illustrate the function of a first embodiment of a feed system according to the invention.

FIG. 3 shows a schematic three-dimensional view from which the operation principle of the feed means according to the invention can be taken. Accordingly, the operating shaft 25 or, more exactly, the outer circumference of the control member 42 is bent in the area between the annular grooves 46, 48 not represented in FIG. 3 in the form of an involute 50 so that the control surface 26 has the cross-sectional profile indicated in FIG. 3.

The pin 28 is biased against the involute profile of the control surface 26 via the resilient end portion of the bending tool holder 30, i.e. the pin 28 is adjacent, on the one hand, to the bending tool holder 30 and, on the other hand, to the control member 42. For clarity's sake it is noted that, in the representation according to FIG. 3, the bending tool holder 30 is fixed to the work spindle 6 which is not shown.

In the case of a relative rotation of the control member 42 with the control surface 26 in the direction of the arrow to the right (direction of rotation for an increasing diameter) the pin 28 is deflected upwards, in the representation according to FIG. 3, by the involute profile 50 so that the bending tool holder 30 and thus the cutting tool 24 are fed in radial direction. Hence the bore diameter is increased by such a feed motion.

In the case of a relative rotation of the operating shaft 25 and thus of the control surface 26 to the left (view according to FIG. 3), the pin 28 is moved downwards so that the radial excursion of the bending tool holder 30 and the bore diameter are reduced.

It is a peculiarity of the feed system according to the invention that in the initial state, i.e. when no feed is desired, the work spindle 6 and the operating shaft 25 are synchronously driven at the same speed so that the pin 28 fixed in the work spindle 6 maintains its relative position on the involute profile 50 and thus no radial excursion of the bending tool holder 30 fixed to the work spindle 6 is effected.

For causing a feed motion the speed of the operating shaft 25 and thus of the control surface 26 is varied vis-à-vis the speed of the work spindle 6 so that the control surface is rotated vis-à-vis the pin 28 in the above-described manner and thus the excursion can be adjusted by selecting the difference in speed. As soon as the desired excursion of the bending tool holder 30 is adjusted, the speed of the operating shaft 25 is again adapted to the speed of the spindle so that no further feed motion is effected. The feed preferably occurs during the machining operation so that no rest periods are caused by the feeding operation. The feed motion can also be effected, of course, when the cutting edge is not engaged with the workpiece.

Figure 4:
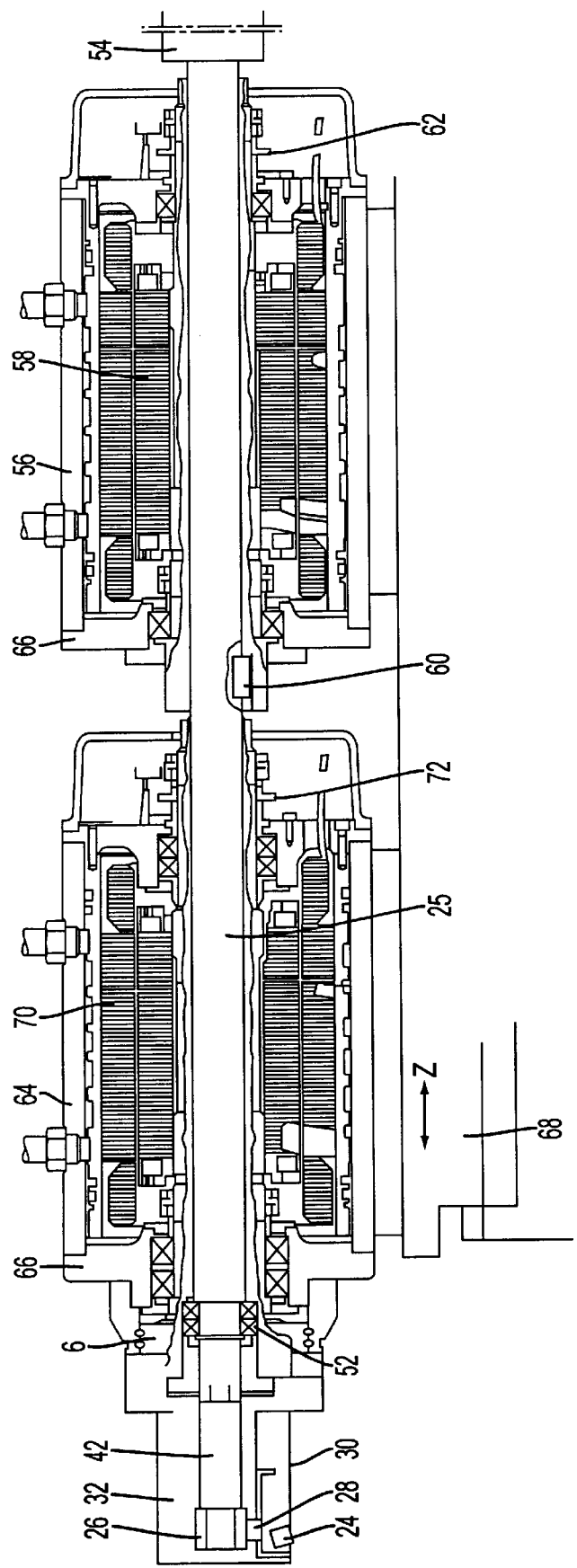
FIG. 4 shows a drive variant for the feed system of FIG. 2.

FIG. 4 shows, in a strongly simplified form, a section across the feed system illustrated in FIG. 2, wherein the drive of the feed system is shown in detail in a sectional view.

The left part in FIG. 4 substantially corresponds to the representation of FIG. 2. Hence it shows a fine boring tool in which the end piece 32—also referred to as boring bar—is fixed to the work spindle 6. The operating shaft 25 to the end portion of which, on the left in FIG. 4, the control member 42 including the control surface 26 is coupled is guided in the work spindle 6. The pin 28 is guided between the bending tool holder 30 and the control surface 26 in the circumferential wall of the boring bar 32.

The operating shaft 25 is run on rolling bearings 52 in a bearing bore of the work spindle 6. At the end portion of the operating shaft 25 remote from the bearing 52 there is arranged a rotating supply 54 for coolants/lubricants (for instance oil, air). The operating shaft 25 and the control member 42 are provided with an axial bore through which the coolant/lubricant can be guided from the supply 54 to the cutting tool. In this area further bearings, which are not shown, are provided to support the operating shaft 25. The support can also be designed in a different, constructionally reasonable manner.

The drive of the operating shaft 25 run on bearings in such manner is effected via a feed motor 56 whose rotor 58 is fixedly connected to the operating shaft 25. As a feed motor 56 various designs, such as D.C. motors or three-phase motors including a rotary frequency converter can be employed. It is important that the rotor 58 is coupled with the operating shaft 25 free from play. In the present case a feather key 60 is used for this purpose.

The speed of the operating shaft 25 and thus of the rotor 58 is detected via a sensor 62. The electric motor 56 has a casing 66 in which rolling bearings are arranged to support the rotor 58. The casing 66 is fastened to the machine tool.

The drive of the work spindle 6 is effected via a spindle motor 64 which, in principle, is structurally similar to the feed motor 56. As a rule, the spindle motor 64 will require a higher driving power than the feed motor, however, because the machining output has to be rendered by the former.

The casing 66 of the spindle motor is mounted on a feed unit or in a sliding drill head 68 of the machine tool which is movable in the Z direction, i.e. in axial direction of the bore to be formed.

A rotor 70 of the spindle motor 64 is connected free from play to the work spindle 6, wherein the rotor 70, in turn, is run on rolling bearings in the casing 66. The speed of the rotor 70 and thus of the work spindle 6 is detected via a sensor 72. The embodiment of the feed system represented in FIG. 4 has a very compact design due to the coaxial alignment of the work spindle 6, the operating shaft 25 and the two drive motors 56, 64, the rotating masses being restricted to a minimum by the direct coupling of the two motors 56, 64. Due to an adequate drive technology the two drive motors 56, 64 can be adjusted synchronously or exactly at the desired difference in speed so that the entire control surface is adjustable for the feed motion. The two motors 56, 64 are preferably driven via a digital drive technology.

As already indicated in the foregoing, when forming a cylindrical bore both drive motors 56, 64 are operated at the same speed, wherein the relative position of the pin 28 with respect to the control curve 26 is initially adjusted by an adequate speed difference. The diameter of the finished bore is detected during the machining operation or immediately afterwards by an adequate measuring station so that, in the case of deviations from the desired measure, these can be compensated by controlling the feed motor 56.

When forming bores whose diameter is variable dependent on the boring length (for instance bores having convexly or concavely curved circumferential walls or when forming grooves, etc.), the feed motor 56 is driven dependent on the feed or the boring depth. I.e. in such applications the control of the feed signal and the actual measure of the bores have to be taken into account so as to be able to adjust the required feed motion via a speed difference.

Figure 5:
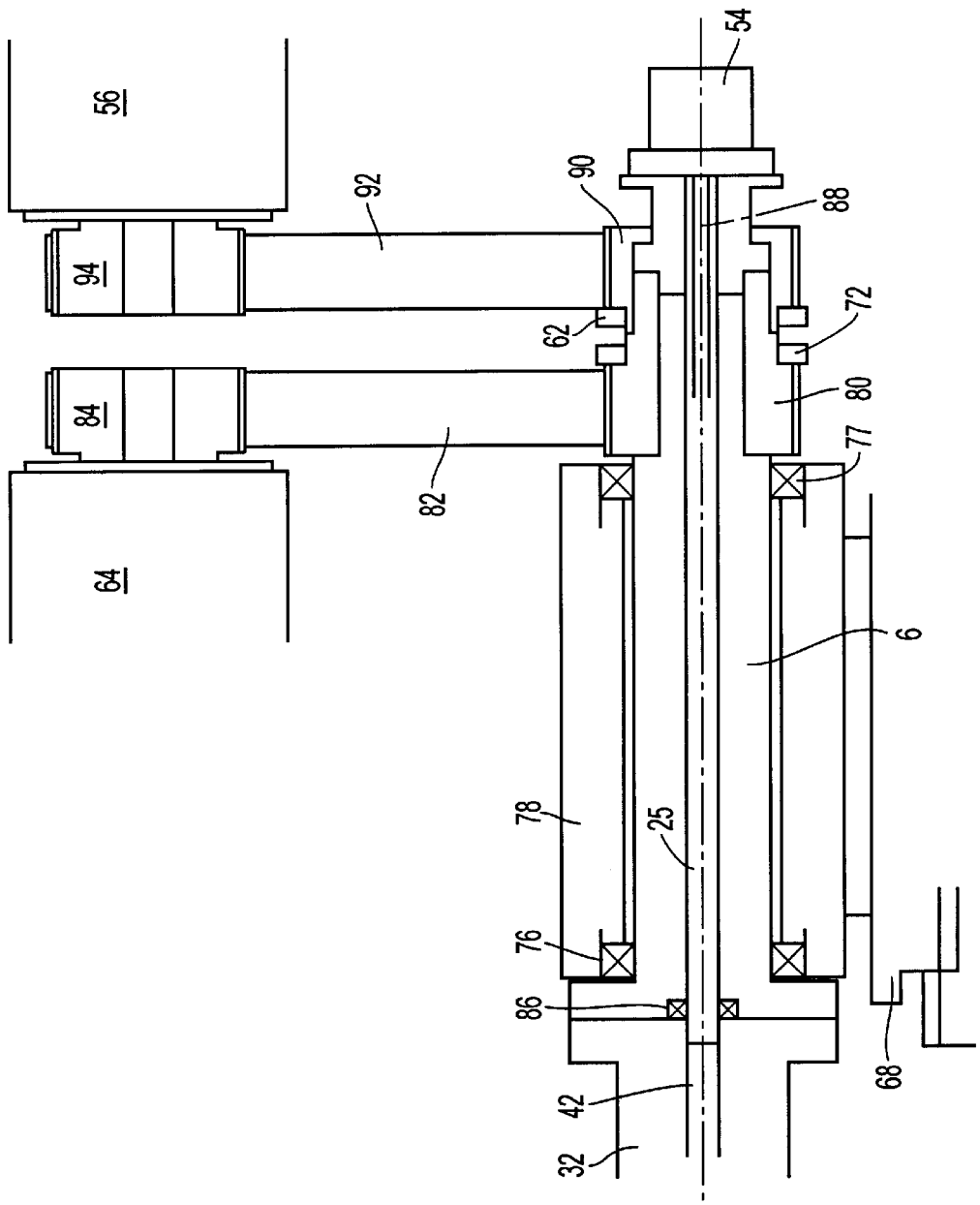
FIG. 5 shows a further drive variant for the embodiment of FIG. 2.

In FIG. 5 another variant of a drive for the feed system is indicated.

While in the above-described embodiment the drive motors were coupled directly to the work spindle 6 and/or the operating shaft 25, in the embodiment illustrated in FIG. 5, in which merely the part of the feed system on the drive side is shown, a belt drive is used for transmitting the driving torques of the feed motor 56 and the spindle motor 64, respectively.

The work spindle 6 is run on rolling bearings 76, 77 in a case 78 mounted on the sliding drill head 68. At the end portion of the work spindle 6 which is stepped back in radial direction, shown on the right in FIG. 5, a synchronous pulley of the spindle is supported free from play which is driven by a synchronous belt 82 that, in turn, meshes with a driven pulley 84 of the spindle motor 64 arranged at a parallel distance from the axis of the spindle. The end portion of the operating shaft 25 shown on the left in FIG. 5 is run—similar to the above-described embodiment—on rolling bearings a 6 in the work spindle 6. The other end portion of the operating shaft 25 is supported by bearing arrangements which may be disposed in the area of the supply 54 for coolants/lubricants. Via this rotating supply 54 the coolant/lubricant can be guided through the axial bore 88 indicated in broken lines to the cutting edge.

In the area of the supply 54 a synchronous pulley 90 is fixedly connected to the operating shaft 25 which is in mesh with the driven pulley 94 via a synchronous belt 92 so that the driving torque of the feed motor 56 can be transmitted to the operating shaft 25.

The speeds of the synchronous pulley 80 of the spindle and the synchronous pulley 90 are in turn sensed by sensors 72 and 62, resp., which are connected with the control unit for controlling the two drive motors 56, 64.

The control is substantially effected in the same way as in the above-described embodiment so that further explanations can be dispensed with.

The variant represented in FIG. 5 has the advantage that the axial length of the feed system is smaller compared to the embodiment of FIG. 4 and that the synchronous belt drive constitutes a robust design which is easy to maintain and allows the use of standard parts as well as permits changes in the drive characteristic in a simple way even subsequently by exchanging the synchronous pulleys.

Figure 6:
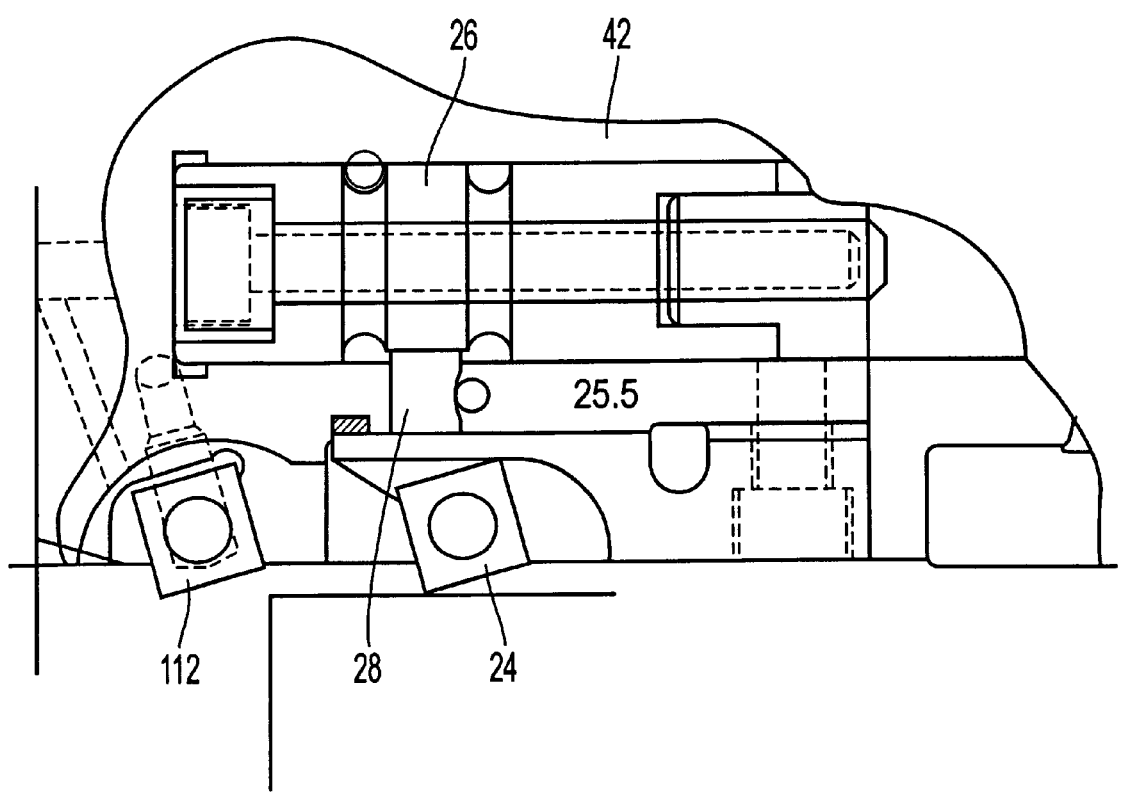
FIG. 6 is a further development of the embodiment of FIG. 2.

In FIG. 6 a variant of the feed system of FIG. 2 is represented. In this embodiment the indexable insert 24 is likewise fixed to a bending tool holder 30 which can be deflected in radial direction by the control surface 26 and the adjacent pin 28 so as to bring the bore diameter to a desired value.

In the embodiment illustrated in FIG. 6 a premachining cutting edge 112 is disposed ahead of the indexable insert 24, wherein the bore to be formed first can be roughly brought to size by the former, while the superfinish is performed by the successive indexable insert 24. As can be seen from FIG. 6, the premachining cutting edge 112 is not adjustable.

Figure 7:
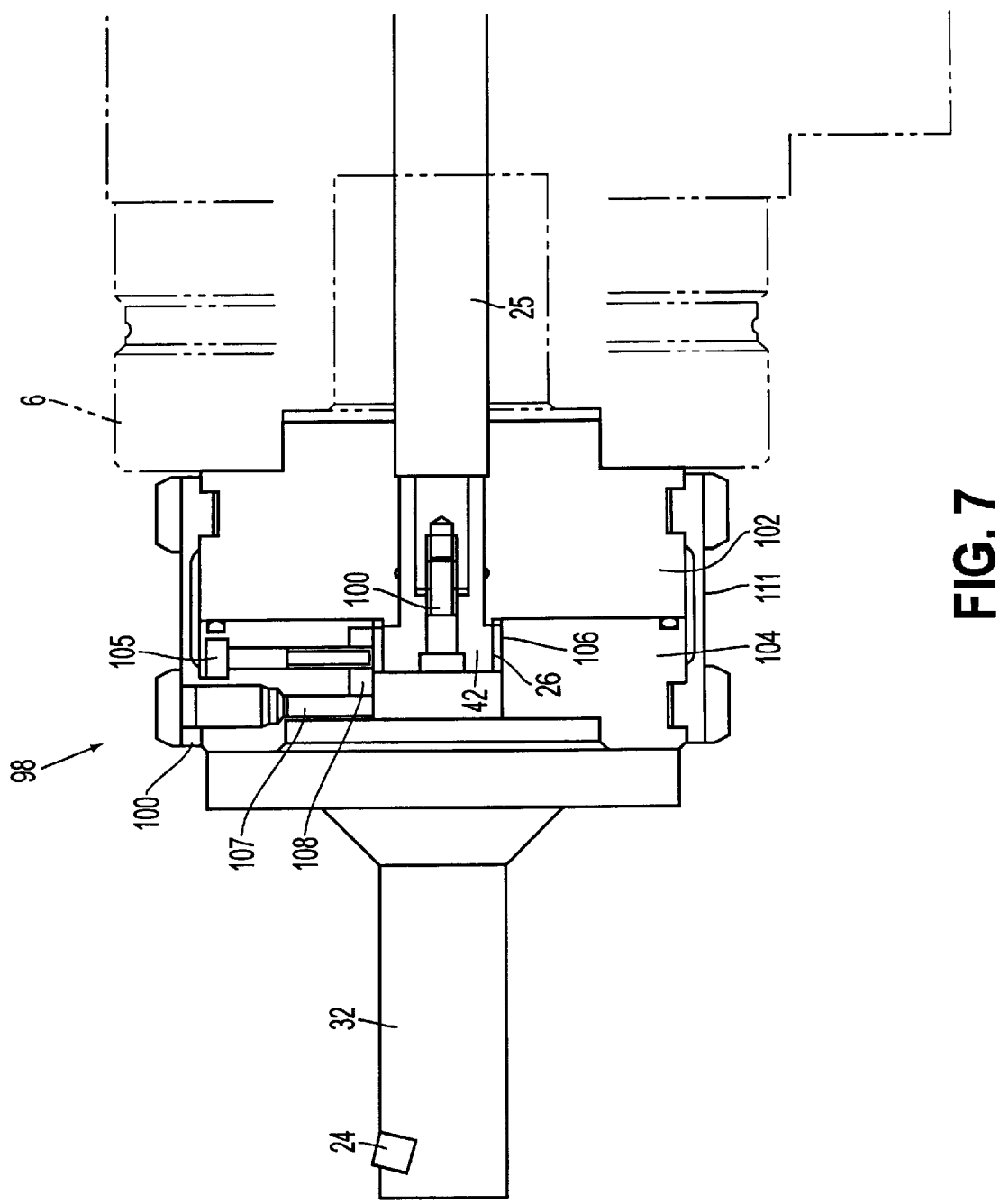
FIG. 7 shows an embodiment of a feed system including a feeding head.

FIG. 7 shows an embodiment in which a feeding head 98 is used instead of the boring bar 82 including a bending tool holder 30 coupled to the work spindle 6.

As in the case of the above-described embodiment, to the operating shaft 25 a control member 42 is fastened at the outer circumference of which a control surface 26 is formed. The latter may again be bent—similar to the embodiment shown in FIG. 2—in the form of an involute.

The control surface 26 is formed on a control flange extended in radial direction in the embodiment shown in FIG. 7. The control member 42 including the operating shaft 25 is attached by means of an axial screw 100 which is screwed into an end journal of the operating shaft 25.

The feeding bead 98 includes a guiding head member 102 which is screwed down with the faces of the work spindle 6. The guiding head member 102 is connected with a feeding head member 104 via two parallel springs 110, 111 which bridge the separating plane between the two head members. In the normal position represented in FIG. 7 the feeding head member 104 is held coaxially with respect to the guiding head member 102. The parallel springs 110, 111 ensure that the parallel arrangement of the head members 102, 104 is maintained even in the case of a radial displacement of the feeding head member 104.

The radial flange provided with the control surface 26 immerses in a guiding bore 106 of the feeding head member 104 and is adjacent to a hardened limit stop washer 108 which is connected with the circumferential wall of the feeding head member 104 by means of a locating pin 107 and a screw 105.

The boring bar 32 supporting the cutting tool 24 is attached to the free face of the feeding head member 104 so that a feed motion of the cutting tool 24 is effected by a radial movement of the feeding head member 104.

The position shown in FIG. 7 or any preset relative position of the feeding head member 104 with respect to the guiding head member 102 is maintained as long as the spindle 6 and the operating shaft 25 are synchronously driven at the same speed. As soon as the speed of the operating shaft 25 is varied vis-à-vis the speed of the spindle, a relative rotation of the control surface 26 is effected with respect to the limit stop washer 108 so that, by virtue of the gradient of the involute curve, the feeding head member 104 is moved radially outwardly or inwardly and thus the cutting tool 24 is displaced in parallel to the feeding direction.

During this displacement of the feeding head member 104 with respect to the guiding head member 102 the two parallel springs 110, 111 bring about a parallel position of these two components so that the boring bar 32 cannot tilt. Such a tilting would change the geometry of the cutting edges so that another compensation would be necessary to make up for the related defect.

The limit stop washer 108 is held in a position of contact with the control surface 26 by the two parallel springs 110, 111.

The design of the feeding head including two parallel springs and head members which are movable with respect to each other as illustrated in FIG. 7 only permits a comparatively small feed motion so that such a feeding head is preferably used for quite small bores which, for instance, have a diameter of up to 60 mm.

The boring bar of FIG. 2 including a bending tool holder attached thereto is suited especially well for larger bores.

Figure 8:
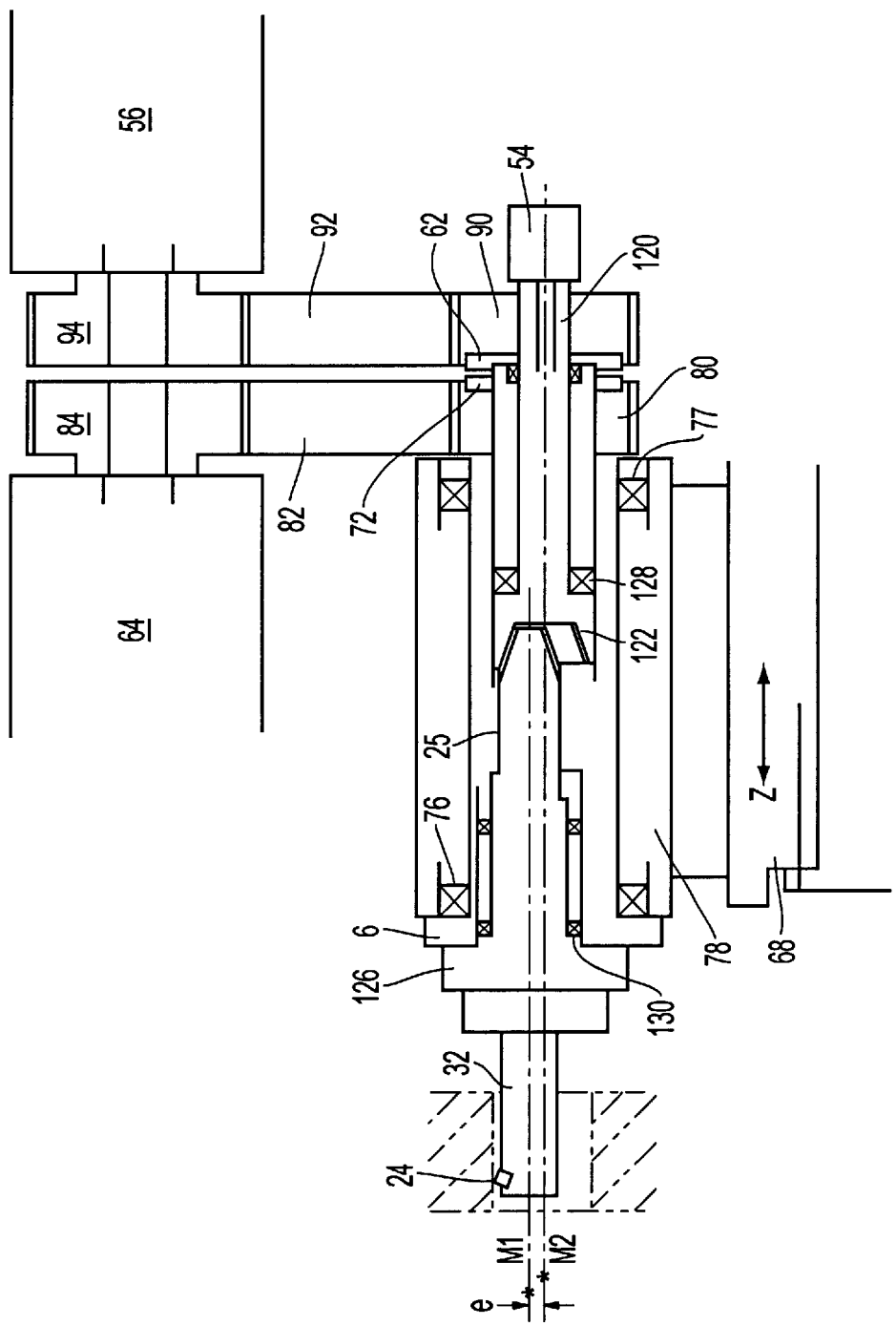
FIG. 8 shows an embodiment of a feed system including an eccentric spindle.
Figure 9:
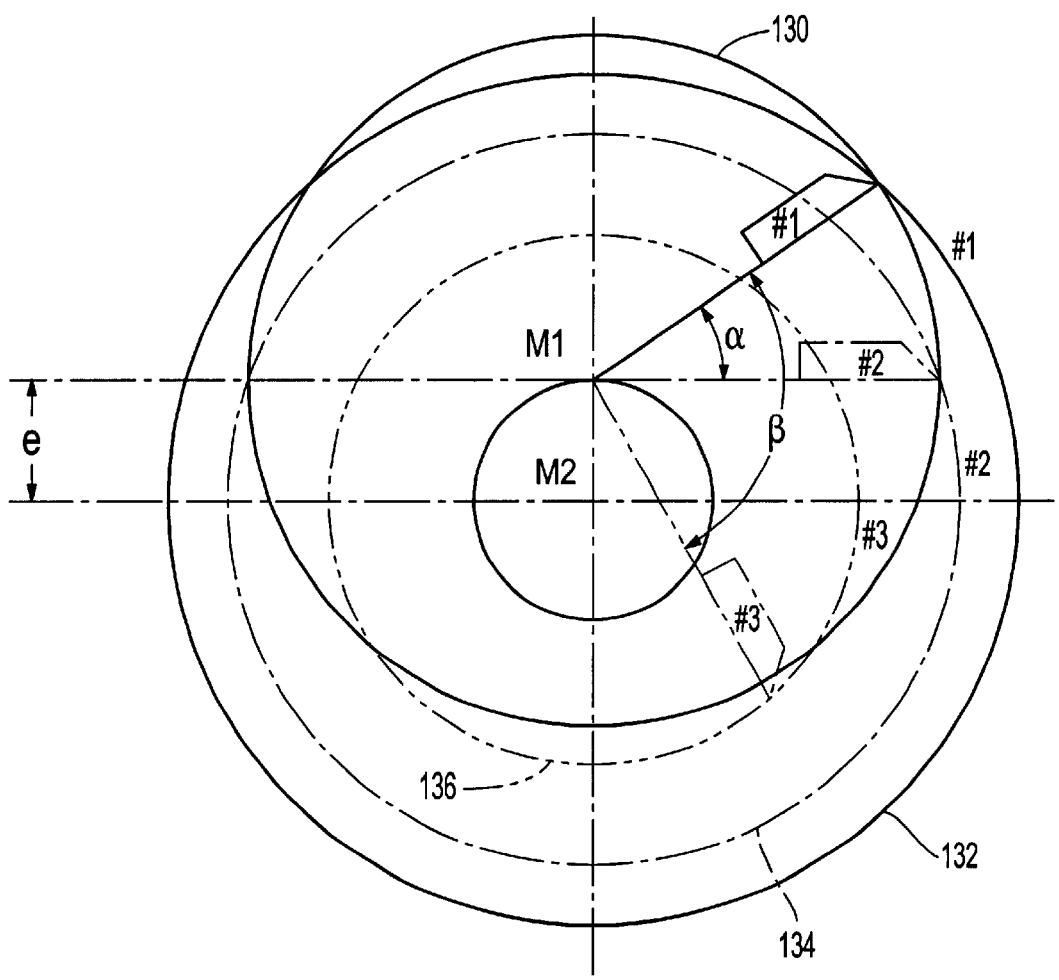
FIG. 9 shows a diagram to illustrate the adjusting movement of the eccentric spindle.

In the FIGS. 8 and 9 a last embodiment of the feed system according to the invention is illustrated in which the tool holding fixture, i.e the boring bar 32 is supported on an eccentric head. An eccentric head of this kind is principally known already from prior art so that merely some components essential for the invention have to be discussed hereinafter.

The drive of the operating shaft 25 and the work spindle 6 is again effected—as in the embodiment of FIG. 5—via drive motors 56 and 64, resp., which are connected to the operating shaft 25 and the spindle 6 through pulleys 90, 94 and 80, 84, resp., and synchronous belts 92 and 82, respectively. The latter, in turn, is run on rolling bearings 76, 77 in a spindle casing 78 which is fixed to the sliding drill head 68—also referred to as advance unit—. The axis of rotation of the spindle 6 is marked by M2 in the representation according to FIG. 8.

The operating shaft 25 is supported inside the spindle 6, as in the case of the above-described embodiments, and includes a drive shaft portion 120 at the end portion of which, shown on the right in FIG. 8, the synchronous pulley 90 and the supply 54 for the coolant/lubricant are formed. At the other end of the drive shaft portion 120 an internal bevel wheel 122 is formed which is in mesh with a corresponding external bevel wheel 124. The latter is formed on an eccentric shaft portion 126 of the operating shaft 25.

The drive shaft portion 120 extends coaxially with respect to the axis of rotation M2 and is run on rolling bearings 128 in the work spindle 6.

The eccentric shaft portion 126 is likewise run on adequate rolling bearings 130 in the spindle 6, wherein the eccentric center is marked by the axis M1. A continuous bore system through which the coolant/lubricant can be guided from the supply 54 to the cutting edge 24 passes through the drive shaft portion 120 and the eccentric shaft portion 126.

On the face of the eccentric shaft portion 126 the boring bar 32 including the cutting tool 24 is mounted, i.e. the central axis of the boring bar 32 extends coaxially with respect to the axis M1 of the eccentric. The feed motion or variation of the adjustment of the cutting edge is effected by rotating the eccentric shaft portion 126 with respect to the work spindle 6 so that the radial distance between the axis of rotation M2 of the work spindle and the tool lip is varied due to the eccentricity. This adjusting movement is schematically represented in FIG. 9. M1 and M2 characterize the axes of rotation of the boring bar 32 and of the work spindle 6, respectively. The indexable insert 24 is fixed to the boring bar 32 and thus moves in the case of a relative rotation of the boring bar 32 vis-à-vis the work spindle 6 on the arc of a circle 130. By virtue of the distance e between the axes M1 and M2 the radial distance between the axis M2 of the work spindle and the tool lip varies in the case of this relative rotation. I.e. in the position marked by #1 the tool lip moves, with the spindle being driven, on a turning circle 132 having a comparatively large external diameter when the eccentric shaft portion is adjusted by an angle a with respect to the work spindle, a turning circle 134 having a mean diameter can be adjusted and, in the case of a relative rotation about an angle β, a turning circle 136 having a smaller diameter can be adjusted.

In case that the adjustment of the cutting edge corresponds to the desired value, the work spindle 6 and the operating shaft 25—or more exactly the drive shaft portion 120 and eccentric shaft portion 126 thereof—are driven at the same speed so that there is no relative movement between the eccentric shaft portion 126 and the work spindle 6—the adjustment of the cutting edge is maintained and a bore having a constant diameter is formed.

For varying the bore diameter and for compensating production defects the speed of the feed motor 56 is varied, until a predetermined speed difference between the eccentric shaft portion 126 and the spindle 6 is brought about so that the aforedescribed adjusting movement is effected. After reaching this desired value, the work spindle 6 and the operating shaft 25 are again driven—as in the aforedescribed embodiment—at the same speed so that no relative displacement occurs between the eccentric and the spindle 6.

Such an eccentric spindle can principally be employed in response to the eccentricity for bore diameters of 10 mm or more.

The speeds of the spindle 6 and the operating shaft 25 are in turn sensed by sensors 72 and/or 62 by which an adequate control is effected. The control inputs for the feed and for the speed of the motors are generated, for instance, in an interpolator from the data detected by the sensors 62, 72, the geometry of the tool and the feed motion in the closed loop position controls operating as a follow-up system the desired actual position of the tool is adjusted via the mechanism of the sliding drill head and by an appropriate control of the drive motors. What is important is that the digital or analogous drive technology permits a conformal synchronous operation of the work spindle 6 and the operating shaft so that the desired size can be kept constant. The principle of construction including drive shafts guided inside each other (spindle, operating shaft) has a high rigidity which directly affects the tool lip by minimum excursions. As substantially rotationally symmetrical parts are used, the feed system according to the invention is also suited for high speeds. The dynamic boosters (feed motors 56, 64) permit rapid feed motions which can also be effected during the machining operation so that even a complicated bore geometry can be produced with high accuracy.

There is disclosed a feed system for a rotating cutting tool which is driven by a spindle and is adjustable in the feeding direction via an adjusting means. The adjusting means is driven by an operating shaft which can be driven synchronously with the spindle by a separate feed motor or at a predetermined difference in speed with respect to the spindle. In the case of a synchronous drive of the operating shaft and the spindle no feed is effected, whereas the cutting tool is adjusted, when a speed difference is adjusted by the adjusting means. After adjusting the desired position of the cutting tool, the operating shaft and the spindle are again driven at the same speed.

What is claimed is:

1. A feed system for a rotating cutting tool (24), comprising a tool holding fixture (2, 32) driven by a spindle (6), and an adjusting means moving said tool holding fixture (2, 32) in the feeding direction, characterized by an operating shaft (25) which supports said tool holding fixture (2, 32) and is guided with an eccentric portion (126) forming a control surface of said adjusting means in an eccentric holding fixture of a spindle (6) forming a transmission element and which is adapted to be driven synchronously with said spindle (6) or at a predetermined difference in speed with respect thereto by means of a separate feed motor (56).

2. A feed system according to claim 1, characterized in that said operating shaft (25) is guided in said spindle (6) at least in portions and said control surface (26) is formed at the outer circumference of said operating shaft (25).

3. A feed system according to claim 1, characterized in that said tool holding fixture (2, 32) supports a roughing cutting edge (112) which is adjustable.

4. A feed system according to claim 1, characterized in that each of said spindle (6) and said operating shaft (25) are adapted to be driven via a belt drive (80, 82, 84; 90, 92, 94).

5. A feed system according to claim 1, characterized in that each of said spindle (6) and said operating shaft (25) are coupled to a rotor (70, 58) of an electric motor (56, 64).

6. A feed system according to claim 1, characterized in that the drive is controlled either by an analog or digital means.

7. A process for controlling a feed system for a rotating cutting tool, comprising a tool holding fixture (2, 32) driven by a spindle (6) and an adjusting means moving said tool holding fixture in the feeding direction, wherein an operating shaft (25) supporting said tool holding fixture (2, 32) is guided with an eccentric portion (126) forming a control surface of said adjusting means in an eccentric holding fixture of a spindle (6) forming a transmission element, said operating shaft (25) being driven synchronously with said spindle (6) or at a predetermined difference in speed with respect thereto by a separate feed motor (56), comprising the steps of:

a) driving said spindle (6) at a predetermined speed;

b) synchronously driving said operating shaft (25) at the same speed, if no feed is to be effected; or c) adjusting a difference in speed between the speed of the spindle and the speed of said operating shaft so that said eccentric portion (126) is rotated with respect to the spindle (6) in order to bring about an adjustment of said tool holding fixture (2, 32) in parallel to the feeding direction;

d) synchronously driving said operating shaft (25) and said spindle (6) after the desired feed value has been adjusted.

8. A process according to claim 7, characterized in that in step c) the speed of said spindle is maintained and the speed of said operating shaft is varied far adjusting the difference in speed and then, correspondingly, in step d) said operating shaft (25) is again brought to the speed of said spindle.

9. A process according to claim 7, characterized in that in step c) the speed of said operating shaft is maintained and the speed of the spindle is varied for adjusting the difference in speed and then, correspondingly, in step d) said spindle (6) is again brought to the speed of the operating shaft.

10. A feed system according to claim 2, characterized in that said tool holding fixture (2, 32) supports a roughing cutting edge (112) which is adjustable.

11. A feed system according to claim 2, characterized in that each of said spindle (6) and said operating shaft (25) are adapted to be driven via a belt drive (80, 82, 84; 90, 92, 94).

12. A feed system according to claim 3, characterized in that each of said spindle (6) and said operating shaft (25) are adapted to be driven via a belt drive (80, 82, 84; 90, 92, 94).

13. A feed system according to claim 2, characterized in that each of said spindle (6) and said operating shaft (25) are coupled to a rotor (70, 58) of an electric motor (56, 64).

14. A feed system according to claim 3, characterized in that each of said spindle (6) and said operating shaft (25) are coupled to a rotor (70, 58) of an electric motor (56, 64).

15. A feed system according to claim 4, characterized in that each of said spindle (6) and said operating shaft (25) are coupled to a rotor (70, 58) of an electric motor (56, 64).

16. A feed system according to claim 2, characterized in that the drive is controlled either by an analog or digital means.

17. A feed system according to claim 12, characterized in that each of said spindle (6) and said operating shaft (25) are coupled to a rotor (70, 58) of an electric motor (56, 64).

18. A feed system according to claim 4, characterized in that each of said spindle (6) and said operating shaft (25) are coupled to a rotor (70, 58) of an electric motor (56, 64).

19. A feed system according to claim 5, characterized in that each of said spindle (6) and said operating shaft (25) are coupled to a rotor (70, 58) of an electric motor (56, 64).

* * * * *